United States Patent
Plymouth et al.

(10) Patent No.: US 9,953,326 B2
(45) Date of Patent: Apr. 24, 2018

(54) ALERT OPTIMIZATION SYSTEM AND METHOD

(75) Inventors: Kathleen L. Plymouth, Philadelphia, PA (US); Ashish P. Ajmera, Jersey City, NJ (US); Sean H. Murray, West Chester, PA (US)

(73) Assignee: JPMorgan Chase Bank, N.A., New York, NY (US)

(*) Notice: Subject to any disclaimer, the term of this patent is extended or adjusted under 35 U.S.C. 154(b) by 158 days.

(21) Appl. No.: 13/462,406

(22) Filed: May 2, 2012

(65) Prior Publication Data
US 2013/0293363 A1 Nov. 7, 2013

(51) Int. Cl.
*G08B 1/00* (2006.01)
*G06Q 20/42* (2012.01)
*G06Q 20/10* (2012.01)
*H04L 29/06* (2006.01)

(52) U.S. Cl.
CPC ............ *G06Q 20/42* (2013.01); *G06Q 20/10* (2013.01); *H04L 63/1425* (2013.01)

(58) Field of Classification Search
CPC .. G08B 1/00; G07F 7/12; G06F 15/16; G06Q 10/00; G06Q 20/00; G06Q 20/04; G06Q 20/10; G06Q 20/32; G06Q 20/40; G06Q 20/202; G06Q 20/3221; G06Q 20/3223; G06Q 20/3224; G06Q 20/3255; G06Q 20/405; G06Q 20/42; G06Q 30/0185; G06Q 30/0224; G06Q 30/0236; G06Q 30/0603; G06Q 40/00; G06Q 40/02; G06Q 40/12; G06Q 50/265; H04L 12/1895; H04L 63/1433; H04L 67/04; H04L 67/26; H04L 67/306

USPC ....... 340/309.16; 705/39; 709/206, 207, 246
See application file for complete search history.

(56) References Cited

U.S. PATENT DOCUMENTS

| | | | |
|---|---|---|---|
| 5,025,373 | A | 6/1991 | Keyser, Jr. et al. |
| 5,708,422 | A | 1/1998 | Blonder et al. |
| 5,783,808 | A | 7/1998 | Josephson |
| 5,966,695 | A | 10/1999 | Melchione et al. |
| 6,185,613 | B1 | 2/2001 | Lawson et al. |
| 6,405,204 | B1 | 6/2002 | Baker et al. |
| 6,484,146 | B2 | 11/2002 | Day et al. |

(Continued)

FOREIGN PATENT DOCUMENTS

| | | |
|---|---|---|
| EP | 917119 | 5/1999 |
| WO | WO-97/41673 | 11/1997 |
| WO | WO-97/45814 | 12/1997 |

OTHER PUBLICATIONS

Mobil Security with Smartcards, Vorn Fachbereich Infomatik der Technischen Universität Darmstadt genehmigte, Dissertation, Roger Kilian-Kehr, Darmstädter Dissertationen D17, 169 pages.

(Continued)

*Primary Examiner* — Brian Wilson
(74) *Attorney, Agent, or Firm* — Calfee, Halter & Griswold LLP

(57) ABSTRACT

Systems and methods are disclosed for providing alerts to one or more customers at an optimized time and communication channel based on at least customer preferences, transactions, activities, usage patterns, and other information; and for allowing customers to directly respond and communicate feedback to alerts that are provided to complete various account actions, including to "snooze" one or more alerts.

27 Claims, 6 Drawing Sheets

(56) References Cited

U.S. PATENT DOCUMENTS

| | | |
|---|---|---|
| 6,535,855 B1 | 3/2003 | Cahill et al. |
| 6,574,630 B1 | 6/2003 | Augustine et al. |
| 6,925,441 B1 | 8/2005 | Jones, III et al. |
| 7,024,374 B1 | 4/2006 | Day et al. |
| 7,025,256 B1 | 4/2006 | Drummond et al. |
| 7,047,532 B1 | 5/2006 | Connelly |
| 7,152,242 B2 | 12/2006 | Douglas |
| 7,370,004 B1 | 5/2008 | Patel et al. |
| 7,485,040 B2 | 2/2009 | Walker et al. |
| 7,493,636 B2 | 2/2009 | Kitsukawa et al. |
| 7,610,172 B2 | 10/2009 | Maskall et al. |
| 2001/0018674 A1 | 8/2001 | Schein et al. |
| 2001/0037315 A1 | 11/2001 | Saliba et al. |
| 2001/0038033 A1 | 11/2001 | Habib |
| 2002/0010867 A1 | 1/2002 | Schaefer et al. |
| 2002/0052782 A1 | 5/2002 | Landesmann |
| 2002/0069105 A1 | 6/2002 | do Rosario Botelho et al. |
| 2002/0069109 A1 | 6/2002 | Wendkos |
| 2002/0070976 A1 | 6/2002 | Tanner et al. |
| 2002/0072931 A1 | 6/2002 | Card |
| 2002/0091628 A1 | 7/2002 | Kunimatsu |
| 2002/0111860 A1 | 8/2002 | Jones |
| 2002/0117541 A1 | 8/2002 | Biggar et al. |
| 2002/0120571 A1 | 8/2002 | Maung et al. |
| 2002/0123948 A1 | 9/2002 | Yumoto |
| 2002/0138414 A1 | 9/2002 | Baker, IV |
| 2002/0152179 A1 | 10/2002 | Racov |
| 2002/0178025 A1 | 11/2002 | Hansen et al. |
| 2002/0188509 A1 | 12/2002 | Ariff et al. |
| 2002/0194081 A1 | 12/2002 | Perkowski |
| 2003/0069780 A1 | 4/2003 | Hailwood et al. |
| 2003/0093574 A1 | 5/2003 | Fablet et al. |
| 2003/0149660 A1 | 8/2003 | Canfield |
| 2003/0182247 A1 | 9/2003 | Mobed et al. |
| 2003/0182263 A1 | 9/2003 | Augustine et al. |
| 2004/0039588 A1 | 2/2004 | Libman |
| 2005/0091156 A1 | 4/2005 | Hailwood et al. |
| 2005/0097046 A1 | 5/2005 | Singfield |
| 2006/0136306 A1 | 6/2006 | Rothman et al. |
| 2007/0174448 A1* | 7/2007 | Ahuja ............... G06Q 10/10 709/224 |
| 2007/0260521 A1 | 11/2007 | Van Der Riet |
| 2008/0103798 A1* | 5/2008 | Domenikos ........ G06Q 40/08 705/318 |
| 2008/0177659 A1 | 7/2008 | Lacey et al. |
| 2008/0183480 A1* | 7/2008 | Carlson ............... G06Q 20/10 705/1.1 |
| 2008/0275779 A1 | 11/2008 | Lakshminarayanan |
| 2009/0070247 A1 | 3/2009 | Simon et al. |
| 2009/0097046 A1 | 4/2009 | Ohta et al. |
| 2009/0210886 A1 | 8/2009 | Bhojwani et al. |
| 2010/0274691 A1* | 10/2010 | Hammad .......... G06Q 20/3221 705/30 |
| 2010/0274866 A1* | 10/2010 | Hammad .......... G06Q 20/202 709/207 |
| 2013/0024300 A1* | 1/2013 | Choudhuri .......... G06Q 40/02 705/16 |

OTHER PUBLICATIONS

Special Report: One world, one love, one banking device?, Neil Ainger, Banking Technology Magazine, Mar. 11, 2011.

Cell Phone Software Formats Checks for Online Banking, Elena Malykhina, InformationWeek, Jan. 24, 2008, <http://www.infromationweek.com/story/showArticle.jhtml?articleID=205917977>.

* cited by examiner

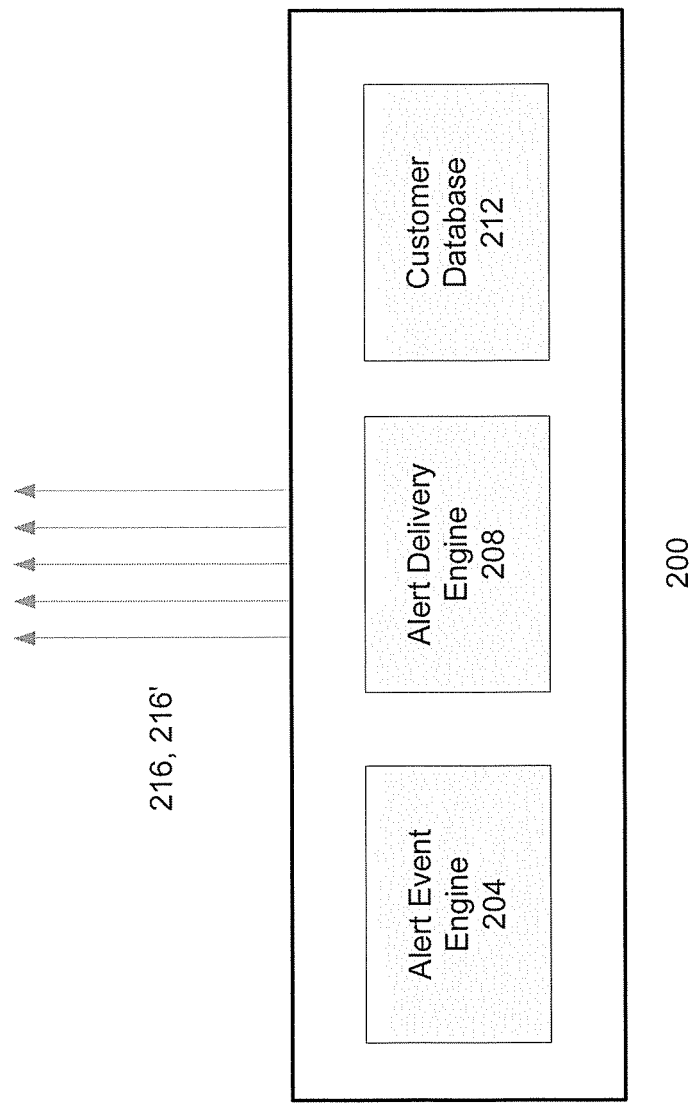

ALERT OPTIMIZATION SYSTEM AND METHOD

FIELD OF THE INVENTION

Embodiments of the present invention are related generally to systems and methods for providing optimized alerts to a customer over a plurality of channels, and more particularly to systems and methods for providing optimized alerts to a customer over a plurality of channels based on at least user preferences and usage patterns and for processing customer responses accordingly.

BACKGROUND OF THE INVENTION

With personal computers, mobile devices, television and the Internet, today's informed customers demand instant access to up-to-date information. Nowhere is this truer than in the financial services industry. In dramatic contrast to what it was even just a few years ago, bank customers today require access to their bank accounts and portfolio from a wide range of devices and access methods and demand that such access methods be available and the information contained therein be updated up to the minute. By logging into a bank's website, an account holder may determine how much he or she has charged on his or her credit cards, download account statements, track net-worth, transfer funds between accounts, and perform other functions.

While this allows the account holders to determine the status of their accounts, such methods of information update are unilateral in nature. Apart from monthly financial statements that may be provided by a bank, account holders must otherwise take it upon themselves to stay updated on the recent events and transactions on each of his or her accounts by manually accessing the bank's Internet website portals, logging into each account and authenticating his or her identity. There are many disadvantages to such an approach including diminished financial security. By its natural burdensome nature, requiring a customer to log in and to access his or her accounts increases financial risks and vulnerability to all parties involved as customers are less likely to be aware of and receive notice of fraudulent and mistaken transactions and are less likely to identify these transactions as such, thereby increasing costs to not only the customers but also the financial institution.

Apart from these fraudulent transactions, customers and banks also incur other costs. Customers may miss credit card, mortgage and other payment deadlines, incurring late fees, processing fees and interest fees simply because they forget such deadlines exist or simply have not recently logged into their accounts.

Just as important, the unilateral approach decreases customer awareness in their individual financial health along with the banks' financial resources. Customers are less likely to have contact with the banks and are less likely to take advantage of additional features that a bank may provide to customers, such as specialized bank accounts, increased lines of credits and unique promotions.

Recently, financial institutions have attempted to overcome some of these deficiencies by the use of alerts, which provide notifications to customers for various reasons. For example, alerts may be provided for payments due or for account activities. However, the current implementations of alerts are limited and offer minimal benefits to the customer and to the financial institution. Account holders of the presently known systems have little input regarding the type, timing, and method of delivery for such alerts. Instead, it is the computer system of the financial institution that determines what alerts are sent. But even then, these systems provide alerts in simplistic and static fashion.

As a result, one difficulty with the existing systems is that they fail to take into consideration the customer's account conditions and history. The current systems utilize basic—and often elementary—methods in determining when an alert should be sent. For example, the systems will simply send an alert via a default setting—e.g., telephone voicemail—when a payment is received for an account, without considering whether the method, timing, and type of alert provided will effectively reach the customer in an optimal manner and time frame for the customer to properly respond. Even if a customer actually receives and reads an alert of suspicious activities on a checking account, he or she may ignore the alert because the message was delivered inconveniently during the morning rush hour and through a text message. Similarly, an alert delivered by a bank may not reach customer in a timely fashion because it was delivered through an automated voice message at the customer's home answering machine while the customer is away during the holidays.

The existing systems also do not act beyond their initial delivery of an alert and do not react to customer responses (or the lack of customer responses). Instead, the systems employ a send-and-forget method of alert delivery. In other words, the systems do not take into consideration that whether the customer actually received the alerts it provides. Once an alert is sent, the current systems assume that the customer has or will receive the alert and make no attempt to ensure that notice was actually provided in a reasonable manner, but instead, simply shift the burden to the customers to find the alert. Given their already suboptimal delivery of alerts in the first place, this flaw serves only to compound the problems of the current systems, making it even less likely that a customer would garner any benefit from alerts of the current implementations. As a result, alerts are not always particularly useful to account holders of these financial institutions despite these attempts.

Accordingly, there is an important need for an improved method and system for dynamically providing alerts to a customer through one or more optimal channels at an optimal time, taking into consideration at least the user preferences and usage patterns of the customers. The solution should not only optimally provide alerts to the customers but also ensure that such alerts provide proper notice to customers.

SUMMARY OF THE INVENTION

The presently disclosed invention satisfies the above-described needs for an improved system and method of providing alerts to customers by utilizing one or more engines to determine the optimal type, time, and method of delivery of one or more alerts. The engines consider a wide range of information in making the determination. Furthermore, the present invention provides solutions to the problems of the above-described "send-and-forget" method of alert delivery by providing the customer with an ability to respond to these alerts and automatically providing subsequent alerts if the customer does not respond adequately.

In one aspect of the present invention, an alert system is disclosed for providing alerts to customers through an optimal communication channel at an optimal time. The alert system includes a customer database and an alert delivery engine. More particularly, the alert delivery engine utilizes processor components to determine the optimal time and the optimal communication channel to provide an alert to a customer based on data in a customer database, which may include activity data and alert preference data. The alert delivery engine is further capable of generating an alert and causing the outputting of the alert at the determined time and communication channel. In one embodiment of the present invention, the alert system further includes an alert event engine for processing at least a portion of the data in the customer database and generating an alert event signal that is associated with at least one customer. In this embodiment, the alert event signal is further configured to receive the alert event signal from the alert event engine.

In another aspect of the invention, an alert system is disclosed to include a customer database, an alert delivery engine, and a customer response engine. The alert delivery engine is configured to determine the optimal time and the optimal channel and to output the alert at the determined time and channel accordingly. Furthermore, the alert delivery engine determines the time and channel based on data in the customer database, which may include activity data and alert preference data. In addition, the customer response engine may receive a customer response to at least one alert. In one embodiment, the customer response engine receives a response to the alert that was provided to the customer by the alert delivery engine.

In a different aspect of the invention, a computer-controlled method for providing alerts to customers through an optimal communication channel at an optimal time is disclosed. In this disclosed method, an alert event signal is received at an alert delivery engine that is associated with a customer. Next, the optimal time and communication channel is determined based on data in a customer database which includes activity data and alert preference data. Furthermore, the alert is generated and outputted at the determined time and communication channel. In several embodiments, the alert event signal is generated.

In yet another aspect of the invention, an alert system for providing alerts to customers through an optimal communication channel at an optimal time in response to an alert event is disclosed to include a customer database, an alert event engine, a customer response engine and an alert delivery engine. The alert event engine is configured to process at least a portion of the data in the customer database and to generate an alert event signal that may be associated with a customer. The alert delivery engine, on the other hand, has the capability to receive the alert event signal from the alert event engine, which may be associated with a customer. The alert delivery engine further determines the optimal time and the optimal communication channel to provide an alert to the customer in accordance with the alert event signal and based on the data in the customer database, which is disclosed to include at least activity data and customer preferences. The alert delivery engine may determine the optimal channel and time based on usage data of the plurality of channels of the customers, priority of the alert event signal, and/or location and timing of customer activities. Furthermore, the alert is generated and outputted at the determined time and communication channel. The customer response engine may receive the customer responses, which may include at least a response to the alert that is outputted at the alert delivery engine.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 2A is a block diagram illustrating an alert system in accordance with an embodiment of the invention.

DETAILED DESCRIPTION OF THE INVENTION

Embodiments of the presently disclosed invention are directed to an alert optimization system and method that utilize one or more engines to determine the optimal type of alerts to deliver and the optimal time and method of delivery of one or more alerts, taking into consideration at least the user preferences and usage patterns of the customers. The disclosed invention maximizes the effectiveness of alerts by distributing an alert according to the optimal time and method of delivery that a customer would find most convenient and beneficial.

It should be readily apparent to one of ordinary skill in the art that the presently disclosed invention may be implemented in a wide range of industries including any businesses and institutions that would benefit from a dynamic alert system capable of delivering notifications to customers or account holders in an optimized manner and actively responding to the customer as necessary. In the preferred embodiments, the presently disclosed invention is implemented for use by a financial institution, such as a bank.

Figure 1:
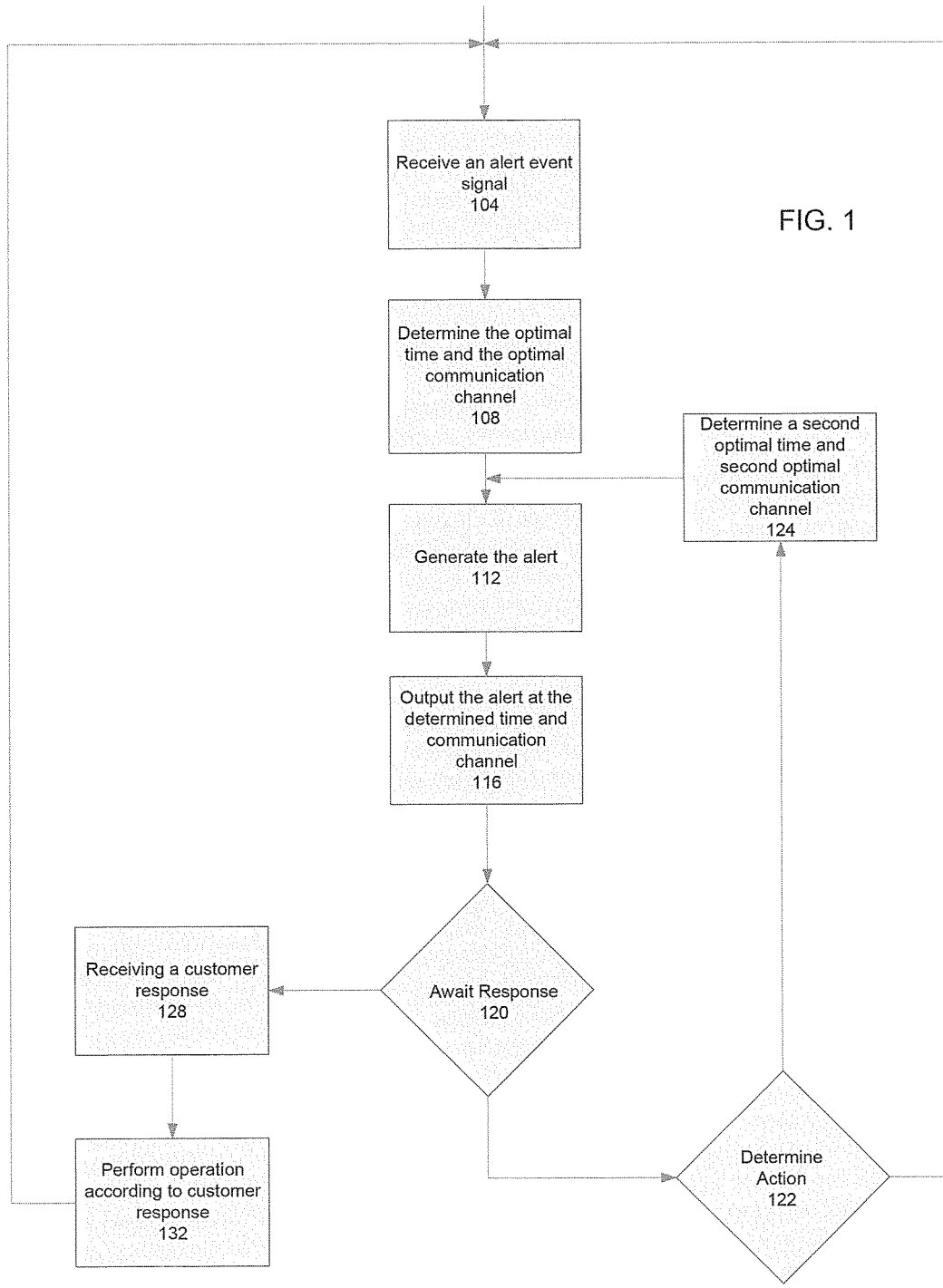
FIG. 1 is a flow chart illustrating an exemplary method in accordance with a preferred embodiment of the invention.

FIG. 1 depicts a flow chart illustrating an exemplary method for providing alerts to customers through one or more optimal communication channels at one or more optimal time in accordance with a preferred embodiment of the invention. The term "customer" is used in this detailed description to generally describe customers of the financial institution, which may include account holders, clients, members, and/or others according to various embodiments of the present invention.

At step 104, an alert event signal is received, which indicates the need to provide to at least one customer of the bank an alert through one of the communication channels available. In one embodiment, the alert event signal is generated.

The alert event signal may be generated in response to preferences configured by a customer of a bank. The customer may customize what alerts will be provided by identifying an alert condition which, when met, would cause the generation of the alert event signal. Generally, the customer may define the alert condition based on any number of attributes, including defining attributes that may relate to the transactions and accounts of the customer. The customer may also define alert conditions based on external information and activities of the customer such as those on social networks, other financial institutions, regulating agencies, the customer's devices and other sources.

Along with alert event signals that are generated according to customer preferences, alert event signals may also be dynamically generated according to detected conditions in the account of the customer, at the bank of the customer, on social networks and at other external sources such as other financial institutions, regulating agencies, news agencies, and customer devices. Indeed, many of the conditions that may be defined by the customer for the generation of an alert event signal may similarly cause the dynamic generation of the alert event signals.

Thus, an alert event signal may be generated according to customer preferences or generated dynamically in response to a plethora of activities or information from various sources.

Transactional activities of the customer, for example, may cause the generation of an alert event signal. Examples of transactional activities may include purchases, transfers, withdrawals, drafts, bank charges and earnings, payments, deposits, and others types of transactions. Furthermore, the attributes of each transaction, such as the type, location, time, amount, and parties involved may affect whether an alert event signal is generated. For instance, an alert event signal may be dynamically generated in response to the purchase of merchandise over $1,000 in a foreign country using an account holder's savings account.

Activities external to the financial institution may also cause the generation of an alert event signal, such as social activities on a social network, blog, discussion forum, or website, such as a posting, status message, comments, public message, or an article. As an example, the customer may want an alert to be sent when a transaction is made in a location that differs from the customer's last known location, as determined by metadata and content of the customer's last social networking entry.

The customer's activities and status may also be gathered from the devices of the customer, such as the customer's computer, mobile phone, mobile device, cars, and others. Information that may be gathered may include, but is not limited to, the location of the customer, the attributes of the device, and the status of the customer. Thus, a fraud alert event signal may be generated because a transaction for over $100 is completed and, according to the customer's global positioning information received from the customer's phone, he is not within 25 miles of the transaction's location. Similarly, if a transaction was completed on a computer that is different from the customer's currently used computer, an alert event signal may be generated. Furthermore, an alert event signal may be generated if a transaction was completed and according to the calendar of the customer's phone, he or she was in a 3 hour meeting when the transaction was completed.

Information from various other sources may also cause the generation of the alert event signal. For example, an alert event signal may be generated based on the customer's general account information (e.g., the account holder's home address, local branch of bank), including any changes or deletions to such information. An alert event signal may be generated based on information from credit bureaus, news agencies, regulating agencies, other financial institutions, and other third party sources.

From the various sources, the income, age, family composition, lifestyle, and length of residence and other information of the customer may be determined, which may also be used to determine if an alert event signal should be generated for a given situation. For example, a transaction may be considered to be more legitimate because it was completed in the hometown of the customer. Furthermore, information and activities from other customers may be considered, including customers with similar attributes. As one benefit, data from similar customers may indicate that a similar alert would be beneficial to a particular customer. In addition, data of other customers and statistical trends may also help determine what alerts are preferred and may be beneficial to customers.

In one preferred embodiment of the present invention, alert event signals may also be dynamically generated that provide customers with messages describing the bank's available resources, programs, and promotions. These offer alerts may be dynamically provided in response to detected account conditions as well. For example, an alert event signal may refer the customer to a bank's financial advisor specialist if it is detected that the customer frequently overdraws his or her checking account or that the customer keeps a large sum of money in a checking account (instead of a savings account). Similar to other types of activities and information that may cause the generation of an alert event signal, an offer-related alert event signal may be generated based on information outside of the bank itself. Thus, upon determining that the customer has recently started looking for a house (e.g., according to a social network post), an alert event signal may be generated to provide the customer with an offer for a mortgage at a low interest rate. In at least one embodiment, the loan may be pre-approved for the particular customer based on the customer's credit and account information. Other examples of offer-based alerts include those that offer auto-pay, fraud protection, or similar features of the bank. In at least one embodiment, general advertisements may also be provided to the customer based on transactions completed by the customer.

An alert event signal may also be generated to provide the customer with a message asking the customer whether he or she would like to enable a type of alert. The customer may be provided such alerts based on recent account, transaction or social networking activities, for example. For instance, after a customer reported that a transaction was fraudulent, the customer may be offered via an alert over the phone, whether he or she would like to enable alerts for fraudulent activities as well as other types of alerts.

The customer alert conditions may take priority over alert conditions that are dynamically generated. This ensures that the customer's desires are first met and any alerts dynamically provided based on the activities of the customer serve only to supplement the customer's preferred alerts. This also prevents customers from receiving alerts that are in direct conflict with their defined rules. In another embodiment, an alert event signal will be automatically generated (and an alert delivered) that is in conflict with the customer's defined alert conditions. This may be necessary in cases of emergency or when there are highly suspicious activities in the customer's accounts.

Returning now to FIG. 1, the receipt or generation of the alert event signal leads to the determination of the optimal time and the optimal communication channel at step 108. Similar to the generation of the alert event signals, the optimal time and communication channel may be determined based on the preferences set by the customer or, alternatively, may be dynamically generated based on detected conditions.

Thus, in one embodiment, the optimal time and communication channel may be determined based on the preferences set by the customer. Such delivery conditions, which are sometimes referred herein as alert conditions, may define the time and communication channel at which the alert should be delivered and may further define when such delivery configurations should be used based on transactional activities, social activities, and others. Indeed, delivery time and communication channels may also be configured based on external information and activities of the customer from social networks, other financial institutions, at regulating agencies, the customer's devices and other sources.

The customer may define the time for delivery of the alert as any temporal window in a day, week, month and year, according to holidays, or simply at any specific point in time. Similarly, the customer may define and choose any number of communications channels or none at all over which the alert will be delivered. With these features, the customer may, for example, configure his or her delivery conditions to receive alerts of deposits that occur before 6 am as an e-mail, deposits that occur after 6 am as a text message, and deposits over $500 as a voice mail, regardless of the time. In one embodiment, the communication channel that may be designated is not limited to technological communication channels of the customer, but may also be those of another person specified by the customer, such as guardians, parents or relatives.

The customer may similarly configure his or her preferences such that a specific time (or range of time) and/or communication channel should not be used. Thus, a customer can not only configure his or her preferences such that alerts are never transmitted to her email account, he or she may further configure his or her preferences with conditional settings that prevent the delivery of an alert at a specific time and/or channel only when those conditions are met. For example, the customer preferences may prevent alerts to be delivered to his or her email account between 9 am to 5 pm, if the alert relates to her savings account.

In addition, the customer may configure an alert delivery condition based on the alert in question and assign differing delivery preferences based on the type of alert it is, allowing the customer to configure one alert delivery condition for fraud alerts and another for low balance alerts, for example. The customer may also define the time or communication channels based on the priority or tiers of the alert and may further define secondary, tertiary or more communication methods and times to deliver an alert if one or more of the previous attempts fail. Thus, the customer may additionally prioritize the available delivery methods that will be considered by the alert delivery engine when dynamically determining the optimal time and communication channel to deliver an alert. The highest prioritized alert method may be utilized in most instances, for example, unless such delivery methods are not ideal given the alert event signal, the conditions of the user account, or based on other factors that may be configured by the customer or by the system administrator.

Furthermore, the customer may customize the alert delivery preferences by defining the attributes of the transaction that are the subject of the alert. Thus, the customer may specifically define the attributes of the transactions that would require a specific type of delivery condition, such as transactions in his or her savings account. Indeed, any account and transactional information may also be defined to affect which delivery time and channel is utilized such as the type, location, time, amount, and parties involved in the transaction. In addition, information and activities outside of the customer's accounts may also be defined to determine the alert delivery time and channel including activities and information from social networks, other financial institutions, regulating agencies, news agencies, and general websites.

The customer may further define delivery conditions based on whether the customer is on vacation, out-of-town or otherwise unavailable. Indeed, in one embodiment of the present invention, the customer may define vacation delivery settings such that all of the customer's alerts are scheduled for when the customer returns from vacation. The alert information provided may be aggregated and or transformed in a manner that allows the customer to easily understand his or her alerts. Further, these alert reports can be configured to only show those alerts that are still relevant. The list may further be arranged in a prioritized manner according to importance. Indeed, such alert reports are not limited to use when the customer is on vacation but may further be delivered on a weekly or monthly basis.

Alert delivery conditions may also be defined by the customer based on the information received from the customer's devices. Such information may include information related to the customer's location, speed of travel, elevation and the like. Thus, a customer may configure a delivery preference to deliver alerts when the customer arrives at or leaves his office. As another example, alert conditions may be configured to deliver alerts via e-mail if it is determined that the customer is traveling on a train, based on his known current speed of travel. Furthermore, the customer's network connection status information may be utilized in defining delivery conditions. For example, the customer may configure his preferences so as not to deliver alerts when the customer is on a network with low bandwidth. The customer may also configure the preferences based on the status of the customer according to the customer's devices. For example, the customer may not want a voice alert to be provided when he is in a meeting, according to the calendar on his phone. Similarly, if his calendar states that he is on vacation, no alerts would be provided at that time. The type or attributes of the customer's device may also be configured to affect alert delivery. Thus, a customer may configure the preferences such that alert conditions are delivered only if the device that the customer is currently using supports email, otherwise, the alert is provided via text messages.

The customer may also set the priority between delivery conditions, just as he or she is able to prioritize alert conditions. In one embodiment, the customer may define the priority of delivery time and/or communication channels that should be followed when determining the time and channel to deliver an alert. Based on the configuration, the highest ranking delivery communication channel or time may be chosen. Other factors such as the type of alert events, the current time of day and other relevant factors may cause a secondary, tertiary or even lower ranking channel and/or time to be used in the delivery of the alert. As one example, if a customer has as his or her highest ranking delivery communication channel and time, that alerts should be transmitted through e-mail at midnight every night, the second ranking channel and time (text-message as soon as possible) may be used instead if the alert needs to be delivered right away because it is of high importance. Other factors and considerations may be utilized, as configured by an administrator or by the user himself.

Similarly, the optimal time and optimal communication channel may be dynamically determined based on the activities and information about the customer, rather than determined from the preferences of the customer. A wide variety of information and activities are taken into consideration and may determine how and at what time an alert is delivered to the customer. In fact, the activities and information sources that a customer may utilize in defining his or her delivery preferences may similarly be utilized in the dynamic determination of the optimal time and communication channel, including transaction activities, social networking activities, and information at the bank, other financial institutions, regulating agencies, social networks, news agencies, the customers devices and other information sources.

The optimal communication channel and time may be based on the type of alert to be delivered. The importance of an alert may also be considered and may determine whether an alert is delivered through a more highly intrusive communication channel. For example, important alerts, such as those indicating possible fraudulent activities in an account, may be delivered immediately to the person's mobile device, while those that are low in importance, such as those alerts providing balance information or monthly statements, may be provided in an email.

The determined delivery time and method may also be based on the attributes of the transaction(s) or account(s) in question. The delivery method and time, for example, may depend on the type, account, time frame, persons or entities involved, location, currency, account status, due dates, reminders, and others attributes of the transaction in question. Transactional information that is analyzed need not be limited to the transaction or account that is the subject of the alert. Rather, transactional or account activity information, even if unrelated, may provide insight into the customer's current activities. For example, it may be determined that a recent transaction for a customer was the purchase of gas near the address of the customer's job at rush hour. Therefore, it may be determined that a recent bank transfer alert should be sent to the customer's work email in 30 minutes, when the customer is likely to be in the office.

The social activities of the customer in any number of social networks, blogs, and other similar mediums may also be considered. Based on the location, time, and content of recent social activities, different delivery times and methods may be chosen. Furthermore, text, music, video, voice, metadata and other informative indicators may be captured and processed to gather additional information. For instance, it may be determined that that an "account balance" alert should be provided to the customer as a private message to the customer's social networking account if he or she has posted to the account within the last hour. As another example, based on a recent posting on a social network indicating the location of the customer (e.g., "I'm at the Grand Canyon!"), it may be determined that the optimal delivery method would be through a text message. At the same time, a different posting on a blog may discuss the customer's account and about money ("I'm broke! . . . "). As a result, the optimal delivery time may be to deliver the message as soon as possible. Information gathered from social networks and other external sources may be utilized in gathering additional information. For example, based on phone numbers of the customer listed on the customer's social network account, more information about the customer's mobile phone device may be gathered as described in other portions of this disclosure.

Information that may be stored in the customer's account may further help determine the channel and time that the alert is communicated. For example, account information may include names and addresses as well as information including income, age, family composition, lifestyle, demographics, and length of residence. For instance, important alerts, such as fraud alerts, may be communicated to the guardian and/or controlling account holder if it is determined that the other account holder may not be able to respond adequately to the alert. An alert would not be sent to a 90 year old woman but instead may be sent to her daughter's cell phone. This is useful for a variety of households with accounts that are associated with multiple customers and especially households with accounts wherein a main account holder oversees the actions and activities of a second account holder and manages the account.

The delivery method may also depend on the previous actions and interactions the customer may have had with alerts. The optimal time and channel may be chosen based on the time and channel at which the customer most recently responded to an alert, or the time and channel at which the customer has responded the most alerts in the last calendar year. In at least one embodiment, the customer's delivery method is dependent on the customer's feedback to previous alert deliveries, which may be a positive, negative or neutral feedback and may be directed to the alert, delivery communication channel or the delivery time. In some embodiments, the feedback from other customers regarding delivery methods and time may also affect the determination of an optimal communication channel and time for a particular alert.

Similarly, the optimal time and channel may be chosen based on the customer's most recent or common method and time of accessing his or her account, be it via the text messaging, smart phone, computer or voice. As one example, based on the infrequency at which an account receives a deposit in the previous 12 months, the customer may be provided with a "Deposit" alert immediately but through a less invasive channel, such as an email.

The size of a message to be delivered may be considered such that alerts that contain larger messages may be communicated over a communication channel that can accommodate the messages, such as email instead of a text message. Similarly, if the message requires a specific type of information to be delivered, then only channels that can properly deliver such types of information may be used. For instance, e-mail may be utilized if a picture or video needs to be communicated to the customer. In addition, the communication channel utilized may also be dependent on the type of responses or replies that is required from the customer. For example, if a voice verification or fingerprint authentication is required in the response, an alert would not be provided through text messages.

The optimal communication channel and time may also be dynamically determined based on the financial costs that may be associated with a delivery of the alert for a bank and/or for the customer. Lower costs channels and times may be used over higher cost channels. The alert provider may choose to deliver text messages at off-hours when the costs to deliver each text message may be lower for the alert provider. Similarly, the alert provider may reserve the more expensive alert methods to alerts that are the most important, such as those that are in response to very highly suspicious account activities. Along with network costs (e.g., text message and data transmission costs) and other delivery-related costs (e.g., stamps, overnight delivery charges), costs of generating the alert may be considered in determining the optimal channel and/or time. At busy times of day, the costs to generate an alert for an alert provider may be greater for a system generating the alert. Similarly, it may cost more to generate a computer-generated telephone voice alert than to send a simple text message or to use a social network to deliver a message. As such, in such embodiments, the lowest cost communication channel and time may be chosen.

Alert delivery methods may also be determined based on the status and conditions of the various communication channels. Thus, communication channels and the time for delivery may depend on the status of the channels available. If a communication channel is malfunctioning, down, or otherwise unavailable, alternate channels may be utilized or the alert may be delayed until the channel becomes available.

Alert delivery conditions may also be dynamically determined based on the information received from the customer's devices, which as discussed above, may include information related to the customer's geographical information, network connection status, status of the customer according to the customer's device, and type or attributes of the customer's device itself. For example, an alert may be delivered as a text message rather than a voice message because it is determined based on the positioning information gathered from the customer's phone, that he is driving to work in a jurisdiction that does not allow using a cell phone while driving.

In one embodiment, the activity information of the customers may be collected in real-time as they occur, may be collected at certain time intervals, or may be collected only when an alert is to be provided. Furthermore, like the generation of an alert event signal, the customer-defined delivery conditions normally take priority in the preferred embodiment. However, there are some circumstances in which the customer's alerts may be overridden.

Furthermore, the determination of the delivery time and method, along with the determination of what alerts to provide may be improved by analyzing, from time-to-time, the rate of response, the type of response, the type of alerts customers have set in their preferences, the customer satisfaction and other results of alert deliveries from the customers. Statistical analysis may be utilized to determine the optimal types of alerts and the optimal delivery time and method through which to deliver such alerts to customers in order to maximize customer satisfaction and the effectiveness of the alerts.

Furthermore, the information from the customer's profile, third-party information sources, other customers and/or accounts, and other indicators may also be analyzed to determine the personality of the customer. For example based on collected news, studies, and other sources, it may be determined that it is preferable to have alerts be delivered to a customer with a particular type of personality (e.g., a "morning person") just before the customer would wake up, so that the customer may have the information readily at hand when he or she begins the day.

Embodiments of the present invention may allow any of the information and activities analyzed (and the methods) in dynamically determining the optimal time and the optimal communication channel to also be utilized by the customer in configuring his or her alert delivery conditions, and vice versa. Likewise, embodiments of the present invention may determine what alerts to provide based on information, activities, and methods described in conjunction with the determination of the alert delivery time and communication channel, and vice versa.

At step 112, the alert is generated. This may entail forming the message that is to be provided to the customer, including the message content describing the alert. In one embodiment, the alert event signal may contain or simply indicate the message to be provided. In addition, the message may contain personalized information according to the customer account, activities or preferences, which allows the customer to have a greater understanding of the reason for the alert and the actions that are required. For example, the message may state:

Bank acct Chk1-1234 bal $50.00
is below your $100 threshold.
To Transfer X amount from Sav1-1235
reply with msg form: T, amount.

Another message may state:

Your XYZ company bill for $123.45 is due today.
Text 'PAY' and the $ amount to pay your bill and
text 'EXPAY' and the $ amount to pay your
bill same day to guarantee your payment.

In addition to forming the content of the message, the message may be formed according to a message communication channel that has been selected. The message is transformed or placed into a structure that may be properly processed by the device receiving the alert. For example, the message above may be placed in a text message form that may be fully output to a cell phone device for display. Similarly, the message may be processed by a Voice Recognition Unit (VRU) and translated into audio form. This audio message may then be provided to the customer over a telephone line and received on a home phone.

At step 116, the alert outputs at the determined time and through the communication channel that was chosen. Where the determined time is in the future, the alert may be scheduled accordingly.

At step 120, an idle state is entered wherein a response to the alert is waited upon. It should be readily apparent that, any system performing the disclosed method may be processing any number of alerts at the same time and may concurrently be in many differing states at the same time. Thus, a system may be awaiting a response to an alert, but at the same time be determining the optimal time and communication channels with which to output another alert.

A response from the customer may be received from the same channel or from any number of available communication channels. So, a customer may receive a text message alert but respond via email. Furthermore, a response need not be in a form that is in direct reply to the alert. A customer need not respond to a message with his or her own message (e.g., "OK" or "RE: Transfer now"). Rather, a response may be in the form of an action that is responsive to the alert. That is, in response to a low balance alert delivered to a customer's mobile device, the customer may respond simply by logging into his or her account and requesting a transfer into that account.

The presently disclosed invention optimizes the effectiveness of alerts by ensuring that alerts have been properly received. Further, it provides customers with the ability to respond, allowing the customer to quickly and effectively provide responsive instructions and commands. In one embodiment, a customer may request that the alert be retransmitted at a later time. This feature, also referred to as "snoozing" an alert, allows the customer to defer attention and action to a later time when the customer may be able to better address the alert. The customer may set the time for snoozing in his or her response. For example, in addition to the above "Low balance" alert message, the alert may further contain the following message:

To snooze this alert, reply S, space, hours.

The customer may respond with:

S 48

This schedules another alert to be sent in approximately 48 hours. The customer may not only temporarily snooze the alert but may also direct the alert to a different communication channel, such as by replying to a text message with:

S 48 email

By this, the customer requests that a snooze alert be sent in 48 hours to his email, according to his bank profile information. Furthermore, the alert may be snoozed as to recur until the issue is resolved by the customer. Thus, the customer may reply with the following:

S 48 email until T

This indicates that the customer would like for an alert to be sent every 48 hours until he or she has transferred money over to the account. The snooze may be automatically canceled if the customer takes responsive action to correct the issue raised by the alert. Therefore, no additional alerts will be sent if prior to the transmittal of the next "snoozed" alert, the customer accesses the account online and transfers money into the account.

At step 120, the response may be waited upon for a predetermined amount of time, which may vary depending on the type of alert that was provided to the customer. A priority of an alert may affect the length of time that an alert response is waited upon before action is taken. More important alerts, such as those indicating a possible fraudulent transition, may be classified as a higher alert priority, while alerts that are more informative in nature and those that do not require responsive actions, such as a deposit notice, may be classified with a lower alert priority. The customer may then have a smaller time window to respond to a higher priority alert than with a lower priority alert before the alert is retransmitted. In yet another embodiment, the window to respond may expand or contract progressively each time the alert is retransmitted. Similarly, without a response from the customer, higher priority alerts may be retransmitted a greater number of times than lower priority alerts before no alerts are transmitted. In at least one embodiment, the lowest priority alerts are not retransmitted even without customer responses while the highest priority alerts will be continuously retransmitted at regular intervals until the issue is resolved.

In at least one embodiment, a customer response, even if received, must be adequate. Thus, in these embodiments, the acceptability of a response may be determined according to the type, priority, or attribute of the alert that was initially provided.

Step 122 may be taken after a customer response is not received within the time window in response to the alert provided at step 116. At step 122, an action is determined in reaction to the lack of customer response within the time window. In one embodiment, it is determined whether a second alert should be generated and provided to the customer at a second time and through a second communication channel. The attributes of the alerts and the transaction in question, the activities of the customer, and the history of responses by the customer are just some of the indicators that are considered. It may be determined, at step 122, that no additional alerts need to be provided, causing a system to return to step 104. In certain instances, it may be determined that another alert is to be provided to the customer at a second determined time and second communication channel, at step 124.

At step 124, the optimal communication channel and optimal time is determined. In the preferred embodiments, the customer preferences, customer activities, third-party information and other information and activities are considered in similar fashion to the considerations taken at step 108. The optimal communication channel that is determined for the second alert may be different than the communication channel determined at step 108.

After the second time and communication channel is determined, the alert is generated and outputted through step 112 and step 116. After the alert is provided to the customer, the customer response is waited upon at 120 for a second time.

If a customer response is received within the time window, at step 128, the customer response is processed accordingly at step 132. For example, if a snooze command is received, a system may generate an alert event signal, indicating that a second alert is to be transmitted in 48 hours. As a result, the method returns to step 104. Other types of customer responses may be processed at step 132. For instance, when an account has a low balance, the command may cause a customer-defined amount to be transferred from another account. Similarly, if a transaction is identified as a possible fraudulent transaction, the customer may acknowledge the legitimacy of the transaction in his response, cancelling any additional alerts and approving the transaction.

Other embodiments may allow the customer to take any number of actions related to his or her account in response, even if unrelated to the alert. For example, the customer may update his or her profile information and alert preferences, request a transfer of money to an account, cancel a check, check the balance of an account, request a listing of recent transactions, identify and indicate a specific transaction as fraudulent, verify a transaction, request a call from the bank, locate the nearest bank, even open a new account, or provide feedback to the alert system.

In at least one embodiment, the customer may have to authenticate his or her identification as the account holder before the customer requested action may be performed. For example, if the customer's requested action is a request for a transfer to a specified account, the customer may have to enter the last four digits of his or her social security number or account PIN.

The above exemplary method provides customers of an institution with any number of alerts through optimal communication channels at optimal times in accordance with preferred embodiments of the invention. It should be understood that various changes and modifications might be made to the invention without departing from the scope and intent of the invention. Indeed, it should be readily apparent to one of ordinary skill in the art that the presently disclosed alert system may be modified to operate in an operational banking computer system as well as other types of systems in any number of industries.

The Alert System

FIG. 2A is a block diagram illustrating an alert system 200 in accordance with an embodiment of the invention. The alert system 200 may comprise an alert event engine 204, an alert delivery engine 208, a customer database 212 and a plurality of communication channels 216, 216'. The components, together, provide customers with alerts in accordance with various embodiments of the present invention.

The alert event engine 204 may determine or detect a need to provide an alert to one or more customers. The alert event engine 204's determination may be based at least on the information in the customer database 212, which contains information related to one or more customers including activities and preferences associated with each customer. The information contained in the customer database 212 may be updated as transactions are entered and activities take place. For example, the alert event engine 204 may detect that a recent transaction may have been fraudulent. In response, it may notify the alert delivery engine 208 that an alert needs to be provided to the customer. In response, the alert delivery engine 208 may determine the optimal time and delivery method to deliver the alert to one or more customers. In determining these optimal delivery variables, the alert delivery engine 208 may examine the data contained at the customer database 212. Specifically, it may examine the account's transactional activities, social activities, and other indicators from third-party sources, other accounts and other members.

Based on the data contained in the customer database 212 and the alert to be provided—e.g., a possibly fraudulent transaction—the alert delivery engine 208 may determine that it is best to immediately notify the customer through a telephone call to the customer's mobile device. As another example, the system may reason that because a customer purchased gas at a local gas station less than 30 minutes ago at 8:00 AM on Monday, the customer is likely driving to work. Because of this, it may be optimal to call the customer, rather than email or text the customer while the customer is driving. As a result, the alert delivery engine 208 causes the alert to be transmitted in the form of a voice message through the communication channel 216. A call is placed to the mobile device of the customer and a voice alert is provided indicating that there may be a fraudulent transaction on one of the customer's account and describing the specific account and transaction. In one embodiment of the present invention, a customer response is also requested, allowing the customer to directly respond to the alert. Thus, the customer in the example may respond to the telephone call either through voice or dial tones.

Figure 2B:
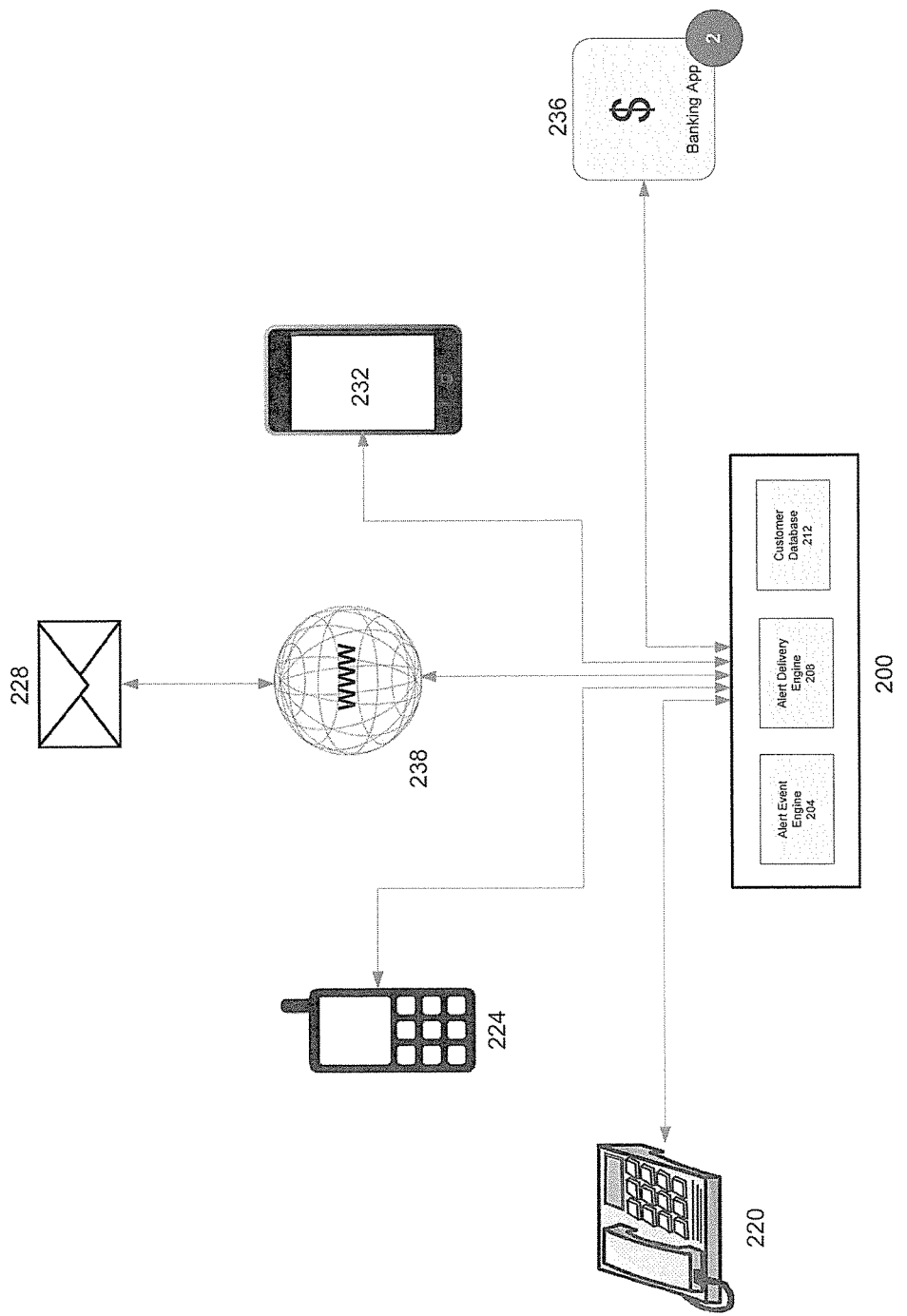
FIG. 2B is a block diagram illustrating an operating environment for the alert system in accordance with an embodiment of the invention.

FIG. 2B is a block diagram illustrating an operating environment for the alert system 200 in accordance with an embodiment of the invention. As seen, the alert system 200 may provide alerts through a number of communication channels, including voice telephone 220, mobile telephone 224, e-mail 228, text messaging 232, application-based notification 236 and other communication channels well known in the art providing communications between 2 or more people. Other types of communication channels, not depicted here, may include chatting, social networking messaging, automated teller machines (ATMs), bank-based notifications, and others. Various electronic devices may be also utilized in communicating alerts including cars, appliances, homes, personal electronics and so on. While email is depicted as one exemplary channel through which an alert may be delivered, it should be readily understood that other types of correspondence and notifications are also well within the scope of this invention, including those that utilize the Internet 238 or other networks well known in the art. Furthermore, the application-based notification channel 236 may include applications that may be developed by the bank or third parties wherein messages and/or notifications may be provided to an instance of the application. Thus, examples of such applications may include, but are not limited to, applications on mobile devices operating on Apple iOS® platform, Android® platform or Windows Mobile® platform; applications running applications utilized in cars and other consumer and non-consumer electronics; and applications running on computers.

In one embodiment, alerts may be communicated by posting a message to a message wall or feed, or similar structures on a social network profile of the customer. The message may be privately or publically available.

As seen, FIGS. 2A and 2B depict embodiments of the present invention as an alert system 200 that operates according to the various embodiments of the present invention described herein. More specifically, the alert system 200 contains all of the functions and data necessary to provide an optimized alert system that provides customers with alerts at optimized times and through optimized communication channels. As described below in more detail, it utilizes a customer database 212 that contains transaction data, customer activities and other relevant information. In at least one embodiment, it contains one or more engines that are configured to collect such data as transactions are entered for an account, as activities occur related to a customer, and as information is made available on the Internet and other sources.

Figure 2C:
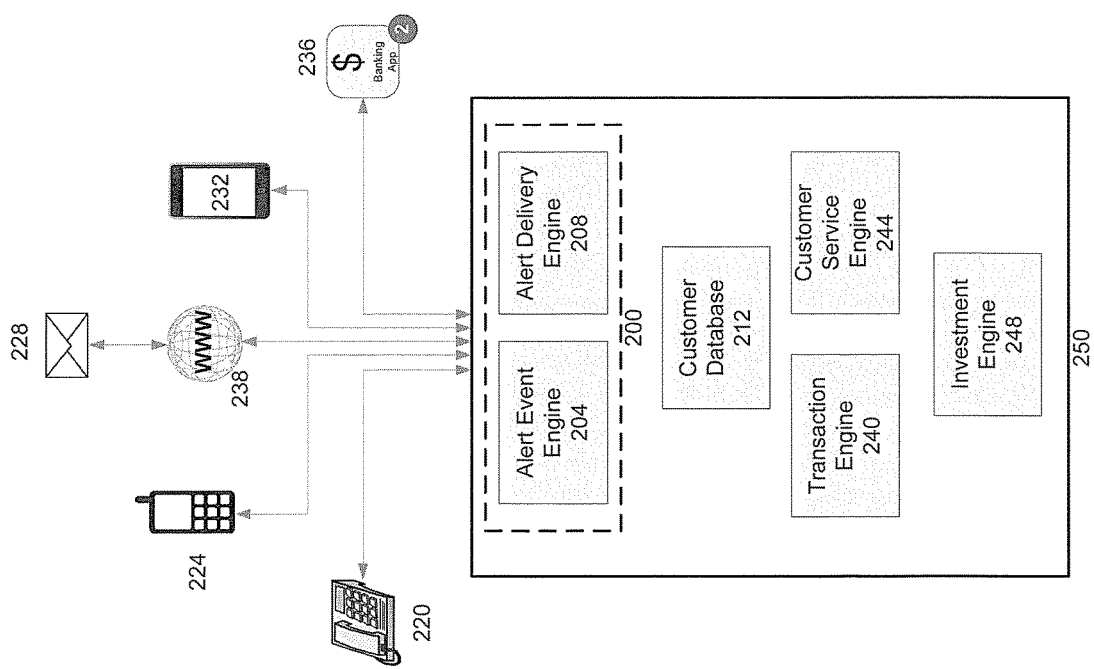
FIG. 2C is a block diagram illustrating the alert system as modified to operate within a banking system in accordance with embodiments of the invention.

In several other embodiments of the present invention, the alert system 200 may be modified to operate with, or incorporated into, an existing operational computer system of a financial institution. FIG. 2C, for instance, depicts a banking system 250 containing the alert system 200 incorporated therein. The banking system, along with the alert event engine 204 and alert delivery engine 208, further contains engines and components utilized by a bank in performing tasks and duties related to the operations of a bank. The transaction engine 240, customer service engine 244 and investment engine 248, shown here, are merely exemplary components of a financial institution. It would be apparent to one of ordinary skill in the art that the banking system 250 may contain additional engines, databases, and components or contain only one or more of the engines depicted. Further, the alert system 250 may contain communication channels not shown, such as communication channels with automated teller machines and other banks.

While the customer database 212 of FIGS. 2A and 2B is entirely within the alert system 200, a customer database 212 of FIG. 2C is shown as separate from the alert system 200. Whereas the former may only contain data necessary in the operation of the alert system 200 of FIGS. 2A and 2B, the latter, along with such information, may also contain other customer information related to the operations the banking system. The customer database 212 may be a central customer database managed by the banking system 250. The banking system 250 may add, delete or modify the data within the customer database 212 in accordance with or in response to other engines, modules or components of the banking system 250. For example, it may modify the database 212 in response to account and profile creation or modification, transaction processing requests, administrative changes, and other actions. At the same time, the alert event engine 204 and the alert delivery engine 208 may similarly manipulate the data contained within the customer database 212. Efficiency may therefore be achieved, as transactions, customer requests, investments of the customers may be automatically updated by the transaction engine 240, the customer service engine 244, the investment engine 248, and other components. To further improve operational efficiencies, the various engines of the banking system 250 may also be modified in order to facilitate the operations of the alert system described in this detailed description. For example, existing infrastructure, engines or features, such as an online access portal of a bank (e.g., website), may be modified accordingly. So, the bank's website may be modified to allow an account holder to create or modify alert preferences and respond to alerts. In some embodiments, the alert system 200 in the banking system 250, includes a copy, a modified copy or another database altogether.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that performs particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer 400 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent Returning now to FIGS. 2A, 2B and 2C, the engines and database making up the alert system are described in further detail.

Customer Database

The customer database 212 is utilized by alert event engine 204 and alert delivery engine 208 to detect transactions, preferences, activities and other information indicating that an alert should be provided to a customer at a particular time and through a particular communication channel. While the customer database 212 is depicted in FIG. 2A as a single database, it may be implemented as one of a plurality of customer databases, with each database containing data of differing sets of customers or, in another embodiment, containing a particular type of data or category of information related to the customers.

Each customer of the bank may be associated with one or more accounts, each of which may be associated with one or more cards, such as a credit card, a debit card, a stored value card, or other type of card; or similarly, may be associated with one or more financial accounts, such as mortgage accounts, checking accounts, savings account, retirement accounts and other types of accounts well known in the art.

Generally, the customer database 212 may be capable of containing several hundred million or even billions of records, or as necessary. The customer database 212 may not only contain information as to each account but also may contain data of the relationships between individual account holders and accounts. Thus, two or more accounts may be related to one another or, similarly, an account may be associated with two or more account holders.

Accounts associated with two or more account holders may define the relationship among the account holders to be hierarchical in nature. An account holder may have power to define the alert preferences and to modify various preferences at the alert system. Thus, it should be readily apparent that the embodiments of the present invention allow a controlling account holder to be alerted of any account activities in any manner and therefore to oversee and manage the financial operations of other account holders. A parent may have an account with her teen daughter and may oversee the accounts operations and define how and in what manners alerts are provided. The teen daughter may, nonetheless, have access to it and have ability to perform certain actions, although they may be limited. The parent, for example, may configure the account such that alerts are provided by the alert system to the parent whenever transactions over $20 are completed.

Figure 3:
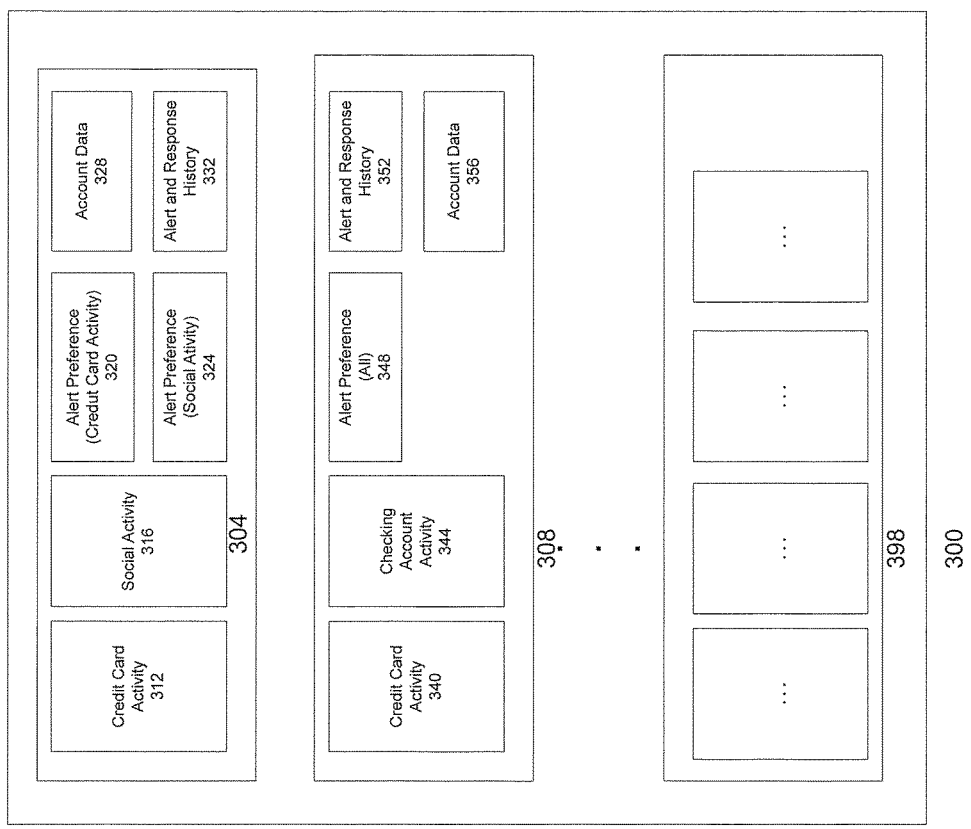
FIG. 3 is a block diagram of a customer database in accordance with an embodiment of the invention.

FIG. 3 is a block diagram illustrating a customer database 300 comprising data of a plurality of customer accounts 304, 308, . . . 398. Each account, such as accounts 304 and 308, may contain account data 328, 356; card and financial account activities 312, 340, 344; social activities 316; alert preferences 320, 324, and 348; and alert/response history 328, 352.

The financial account and card activities 312, 340, 344 stored for each account, in the preferred embodiment, includes transactional history within each of the accounts, such as purchases, transfers, withdrawals, drafts, interests charges and earnings, payments, deposits, and others, including the specific details of each transaction such as location, time, amount, parties involved, and other information.

The customer database 300 may further contain data of social activities 316 associated with an account. Examples of social activities may include public or private posting, entry, status, message, article and other social information published by the customer on social networks, blogs, forums, portals, newsgroups and other information sources. In one embodiment, the customer account database may be configured by the user or the system to be associated with one or more social networking services such as Facebook®, Twitter® or LinkedIn®.

The data of social activities may be gathered by an activity gathering engine (not shown but discussed in detail below), or it may be gathered by the alert event engine 204. Customer database 300 may include the customers' social network accounts that should be tracked in populating the social activity 316 data in an account. In one embodiment, the customer may select the category of activities that should be tracked. For instance, only location information should be tracked from these social activities. Or, only the time of social activities should be tracked and stored, which may indicate whether the customer is active (versus asleep, for example). In another embodiment, only certain keywords indicating certain types of activities may be tracked and stored. For instance, entries referencing a hotel may indicate that the customer is on travel or vacation. In one embodiment, the social activities are provided to the system from an external source.

Each customer account 304, 308 . . . 398, may further contain alert preference data 320, 324 and 348. Such data may include customer-defined alerts (hereinafter referred to as "alert conditions"), delivery preferences (hereinafter referred to as "delivery conditions") and other general alert preferences. Thus, the alert system 200 allows a customer to configure what alerts are provided, when they would be provided, and the method of delivery for such alerts. While the alert system 200, in certain instances, may override such settings in order to provide the customer with an alert that may be necessary to protect the customer, the alert preferences, in general, are fixed and have priority over system-determined alerts and delivery methods.

As discussed in more detail below, the alert conditions may determine what alerts are provided to the customer. Similarly, delivery conditions may determine when the alert would be provided and through what delivery method.

The alert conditions and delivery conditions may be defined by the customer based on various attributes of a transaction, including a particular transaction type (e.g., withdrawal, deposit) that occurs in a particular account (e.g., credit card, debit account, savings) at a range of time (e.g., on Mondays, the $7^{th}$ day of the month, at 7 to 10 pm), involving particular parties (e.g., restaurants, other banks), from a certain location (e.g., outside the United States), in a particular currency (e.g., Euro), having a particular account status (e.g., balance under a certain threshold). For example, an alert condition may indicate that an alert should be provided when there is a transfer of more than $500 from the customer's savings accounts to an out-of-state bank.

Furthermore, alert conditions and delivery conditions may also be defined based on social network activities. Examples of information that may be gathered from social network information include the location of the activity, time of the activity, and the type of activities itself.

In addition, the alert preferences may be based on alert and response history, which may indicate, for example, the last time the customer responded to an alert. In addition, alert preferences 320, 324, 348 need not be based on a particular financial account or card at all but may be based on the customer's account information. Further, an alert may also be configured to be sent to remind the customer to log into the account on the first of every month to manually pay the water bill.

Recognizing the privacy risks associated with the use an activity gathering engine, it may be preferable, in one embodiment, not to utilize social activity data altogether. Instead, this feature may be turned off by default. Customers may then "opt-in" to integrate their customer accounts with one or more social networks and indicators. In another embodiment, limited social gathering features may be turned on by default in order to balance any privacy risks with the optimization of alert delivery.

In many instances, many accounts can be accessed by more than one customer. For example, multiple customers may be authorized to use an account associated with a checking account and a credit card. Multiple customers may have access both to personal credit accounts and small business credit accounts. Furthermore, mortgages are often held by two customers. In some instances, such as with a credit card, a main customer may have control over the account and other customers may merely have access to the account. In these cases, the activity data contained accounts may include data of one, some or all of the customers. As with the opt-in and opt-out features discussed in detail below, the activity data of the customer that will be stored may be configured by the customers (s) and/or may have a default setting. For example, as a default, it may be optimal to record the activity data of all account holders until the system is instructed otherwise.

Furthermore, as seen in FIG. 3, alert preferences 320, 324, 348 may be configurable to a particular card or financial account. Thus, alert preferences of one financial account may differ from another type of financial account, as the customer prefers.

In addition, the customer account database 300 may further contain general account information 328 and 356 and historical pattern information (not shown). As one example, such information in the database 300 may include names and addresses as well as information including income, age, family composition, lifestyle, demographics, and length of residence. Further, such information may include spending habits by category and credit data. In preferred embodiments, the historical pattern information can be updated frequently.

Alert Event Engine

The alert event engine 204 in the alert system 200 determines what alerts should be provided to the customer, based at least on the data in the customer database 212.

The alert event engine 204 monitors the system for alert conditions as set by each account's alert preferences and causes the delivery engine 208 to provide the alert to the customer when a condition is met. Upon the detection of data indicating an alert should be provided to the customer, the alert event engine 204 generates an alert event signal that may indicate to the alert delivery engine 208 that an alert should be provided. The alert event signal may contain information describing the alert, such as the content of the message that is to be provided to the customer.

As discussed, the customer may customize what alerts will be provided by identifying an alert condition which, when met, would cause the generation of the alert event signal. Generally, the customer may define the alert condition based on any number of attributes, including attributes related to the transactions and accounts of the customer. The customer may also define alert conditions based on external information and activities of the customer such as those from social networks, other financial institutions, regulating agencies, the customer's devices and other sources consistent with embodiments of the present invention.

In addition to alerts based on customer preferences, the alert event engine 204 may also actively monitor the customer's accounts, transactions, alert/response history, and account data of each account in order to detect circumstances when additional alerts should be provided. The alert engine 204 may therefore generate an alert event signal according to detected conditions in the account of the customer, at the bank of the customer, on social networks and at other external sources such as other financial institutions, regulating agencies, news agencies, and the customer devices.

In some embodiments, rather than actively monitoring the data within the database, as that may require costly processing power, it may be preferable to process the data in the customer database 212 at regular intervals. In such cases, it is ideal to minimize time intervals between each customer account processing. A balance may be achieved between reducing costs of operation with alert optimization as needed. In yet another embodiment, the alert event engine 204 may receive a signal indicating that a change has been made in the customer database, indicating the customer account and the particular activity that has taken place. In this manner, the alert event engine 204 need not actively monitor the customer database 212. This notice of activity may be provided to the alert event engine 204 by external modules or engines that are not shown but that are utilized by the institution or company. Thus, in the banking system 250, the transaction engine 240, customer service engine 244 and/or investment engine 248 of FIG. 2C, may notify the alert event engine 204 (and similarly the alert delivery engine 208) when data has been added, modified, or deleted in the customer database 212.

The alert event engine 204 may analyze different types of data and make different alert decisions based on the particular customer and/or his or her attributes. In one embodiment, customers may be grouped into one or more classification groups based on common attributes—such as primary bank, home address, income level, types of accounts, frequency of account use, education level, profession, family composition, lifestyle, common usage, and length of residence. What alerts are provided may differ from group to group as determined by the alert event engine 204.

In at least one embodiment of the present invention, the alert event engine 212 operates according to one or more alert policies. Each alert policy may define the data that the alert event engine 204 examines and how it determines an alert should be provided. In one embodiment, the alert policy may be defined in similar fashion to how customers defines an alert condition in his or her alert preferences—by defining the attributes of transactions, social activities, and other indicators that, when present, causes an alert to be provided to the customer. The effectiveness of alert policies may be optimized by the use of alert policies that are more tailored to a particular customer.

The alert event engine 204 may further allow a system administrator to define, modify and delete the alert policies through a user interface. Similarly, the alert event engine 204 may allow customers to add, modify or delete alert conditions (and preferences) as to each of the customer's accounts as stored in the customer database 212. In an alternate embodiment, a separate engine or module may be configured to provide these capabilities. The alert event engine 204 then may have access to this data in monitoring the customer database 212.

The alert event engine 204 may also be configured to refine the system alert policies over time in order to improve the quality of alerts. In other words, it may have the capability to automatically create new alert policies in response to information it may gather over time. By aggregating customer alert conditions, the alert event engine 204 may determine the most frequently defined alert conditions that customers are utilizing and may automatically define an alert policy in similar form. Likewise, it may determine what types of alerts set by the customers are least likely effective by analyzing the most frequently deleted or modified conditions. Moreover, the alert event engine 204 may consider information from other sources such as account activities and social activities in optimizing alert policies, which may indicate the communication channels most utilized, the alerts that the customers are responding to the most, and the attributes of transactions that are indeed fraudulent, for example. Such analysis may be based on an account-by-account basis or may be based on all customer accounts.

Social activities information, in similar fashion, may be aggregated and analyzed to help improve the effectiveness of certain alerts. Analysis of the social activities in conjunction with the rate of customer response and satisfaction may help refine the alert policies that are based on social activities. For example, a high rate of response for fraudulent transaction alerts based on suspicious transaction locations as compared against customer social activity locations may cause the alert event engine 204 to create more alert policies based on information retrieved from a particular social network for a particular group of customers.

The information gathered may also help the alert event engine 204 automatically refine the attributes that define particular groups of customers. The alert event engine 204 therefore may effectively regroup customers based on improved sets of attributes that define them.

When an alert condition has been met, the alert event engine 204 generates an alert event signal that, when received or detected by the alert delivery engine 208, causes an alert to be outputted according to a time and delivery method. The alert event signal may include information related to the alert to be provided, which may include the type of alert, the alert message, the customer account, and/or the transaction. In certain embodiments, the alert policies or customer preferences may also identify the time and communication channel at which the alert should be provided. In other cases, the system policies and customer preferences may define a number of possible communication channels or a time range from which the alert delivery engine 208 must determine the optimal time and channel. Such information may be provided as part of the alert event signal.

In another embodiment, the alert event engine 204 may receive a signal from a module or engine external to the alert system, indicating the need to provide the alert delivery engine 208 with an alert event signal. Thus, in these embodiments, the alert event signal is not tasked with the monitoring of the conditions, but rather, is configured to receive the signal and to generate and provide the alert event signal accordingly.

Alert Delivery Engine

The alert delivery engine 208 serves to receive or detect indications that an alert should be provided to a customer and to provide the alert according to a determined time and communication channel determined to be optimal by the engine 208.

In the preferred embodiment of the present invention, the alert delivery engine 208 receives an alert event signal from the alert event engine 204 that includes information about the alert that is to be provided to the customer. Such information may be used by the engine 208 to determine the optimal time and channel. In another embodiment, the alert delivery engine simply detects that an alert should be generated according to the operations of the alert event engine 204.

In the event that the optimal time or communication channel is already defined by the alert event signal, then the alert delivery engine 208 proceeds to provide the alert to the customer accordingly.

Where the optimal time or communication channel is not provided by the alert event signal, the alert delivery engine 208 may determine the delivery configuration by analyzing the preferences of the customer or may dynamically determine the delivery configuration based on the information at the customer database or external to the alert system.

In the first case, the alert delivery engine 208 may examine the alert delivery conditions defined by a particular customer and determine whether any of the alert delivery conditions are satisfied by examining the data in the customer database as well as external sources if necessary. If the delivery conditions are satisfied, the alert delivery engine 208 proceeds to deliver the alert based on the communication channel and time preferences as defined.

In the second case, the alert delivery engine 208 may also examine the data within the customer database 212 and elsewhere to dynamically determine the optimal time and communication channel. As described in other portions of the detailed description in more detail, the optimal communication channel and optimal time may be determined by the alert delivery engine using information from a wide range of information and activity sources. The information and activities that may be considered include, but are not limited to: the alert to be provided; the transactions and account activities; social networking activities, third party information; general customer information; interaction history with the customer; delivery feedback; size and type of alert message to be delivered; costs of alert delivery and generation; status of the alert system and communication channels; customer device information; similar accounts or customers; and third party information sources.

In one preferred embodiment of the present invention, the alert delivery engine 208 is configured to operate according to one or more delivery policies, each of which may indicate a preferred delivery time and method based on the attributes of the alert and the information contained in the account of the customer. In some embodiments, delivery policies may be defined to affect a defined group of customers. In one embodiment, the delivery policy and the alert policy discussed in reference to the alert event engine 204 are combined as one uniform policy.

The alert delivery engine 208 may further allow a system administrator to define, modify and delete the delivery policies through a user interface. The alert delivery engine 208 may allow customers to add, modify or delete delivery preferences of each of the customer's accounts as stored in the customer database 212. In an alternate embodiment, a separate engine or module may be configured to provide these capabilities. The alert delivery engine 208 may have access to this data in monitoring the customer database 212.

The alert delivery engine 208 may also be configured to refine the delivery policies over time in order to improve the quality of alerts in similar manners to that of the alert event engine 204. It may automatically create new delivery policies or modify existing policies in response to information that it may gather. It, for example, may determine the most and least frequently defined and utilized delivery method and time of each type of alerts. It may also consider data from accounts and social activities in optimizing alert policies. Social activities, in similar fashion, may help indicate the effectiveness of certain alerts. The information gathered may also help the alert delivery engine 208 automatically refine the attributes that define particular groups of customers in relation to a particular delivery policy.

Once the alert delivery engine 208 determines the optimal time and optimal communication channels, it generates the alert according to the communication channel chosen and delivers the generated alert according to the determined time. In one embodiment, the alert delivery engine 208 utilizes the information provided in the alert event signal, including the alert message. The message may be transformed or placed into a structure that may be properly processed by the device receiving the alert. Thus, it may generate an email message, text message, application-based alert message, voice message, social networking message, and others. Accordingly, the alert delivery engine 208 then causes the output of the generated alert through the communication channel according to the time selected. In addition, the alert delivery engine 208, in one embodiment, has the capability to schedule the transmittal of an alert through any one of the communication channels as necessary. In some embodiments, the delivery of the alerts are managed and completed by a delivery engine (not shown).

Alert System with Response Processing Capabilities

In certain embodiments of the present invention, the alert system may further have the capability to receive customer responses to alerts that are provided to the customers. This feature allows for the alert system to determine whether a customer has responded to alerts and to retransmit an alert if necessary, thereby improving the customer's experience by offering the customer the ability to quickly address the issues with his or her accounts. Embodiments of the present invention also allow the customer to quickly defer an alert to a later time when the customer may more effectively address the alert. Thus, these embodiments may further comprise a customer response engine.

Figure 4:
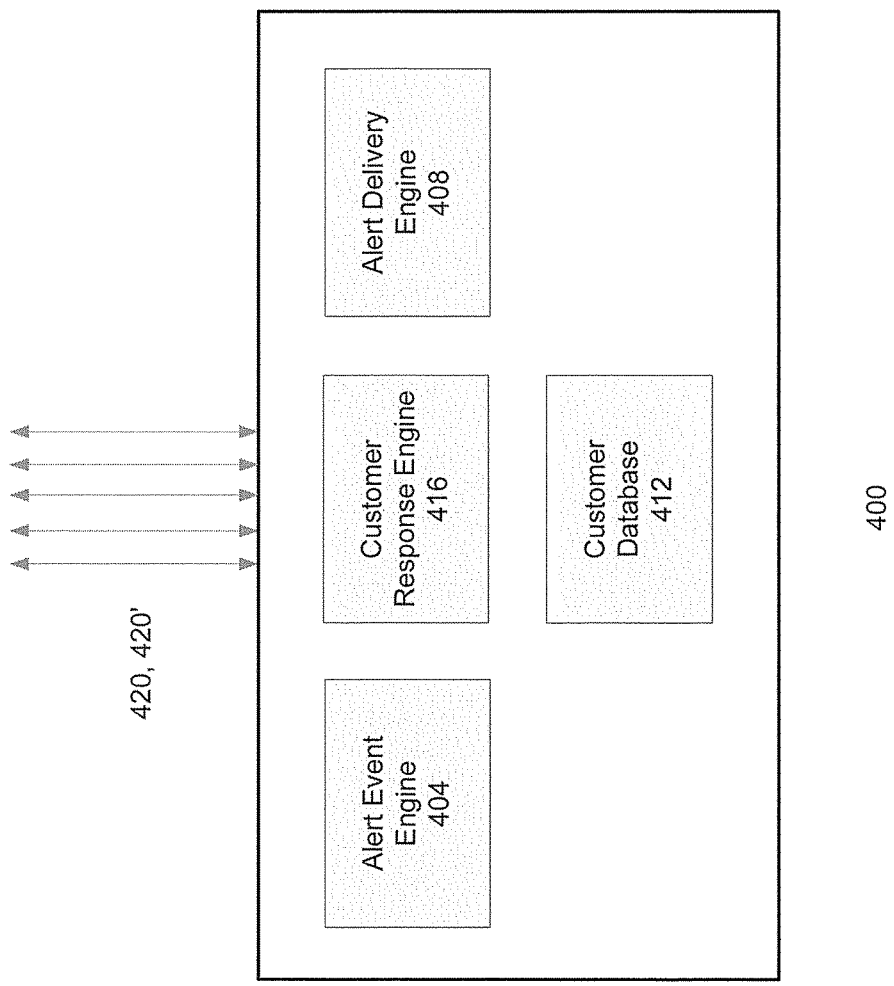
FIG. 4 is a block diagram illustrating an alert system containing a customer response engine in accordance with an embodiment of the invention.

FIG. 4 depicts a block diagram illustrating an alert system 400 containing a customer response engine 416 in accordance with an embodiment of the invention. Similar to the alert system 200 of FIG. 2A, the alert system 400 comprises an alert event engine 404, an alert delivery engine 408, a customer database 412 and a plurality of communication channels 420, 420'. In addition, the customer response engine 416 is configured to receive and process customer responses to the alerts provided.

The customer response engine 416 is capable of receiving any number of responses to alerts. At any given time, the customer response engine may be waiting to receive a response from thousands, if not millions, of customers for particular alerts. The customer response engine 416 may be capable of receiving responses that directly relate to the alert as well as responses that are directed at other unrelated functions of the bank. The customer response engine, however, is not limited to waiting for a response in the same channel that the alert was transmitted. Rather, since it is possible that an alert may be received through another communication channels, it may be configured to receive all responses from all channels available to the alert system 400.

In one embodiment, after an alert is transmitted to a customer for action, the customer database 412 may be updated to indicate that an alert was transmitted. When a response is received by the customer response engine 416, the engine 416 automatically processes the response to determine the corresponding account and alert. It may then process the response accordingly. For example, in receiving a customer response that contains the message "T 400", the customer response engine 416 may access the customer database 212 to identify the customer and determine that the last alert transmitted was related to a low balance. Therefore, it may determine that the received message requests that 400 dollars be transferred from the customer's savings account to his checking account. It may then update the customer account with the transfer request and may update the status of the alert history. In the embodiment shown in FIG. 2C, the customer response engine 420 may notify the transaction engine 240 with the transfer request.

The customer may also request a variety of actions related to alerts. For example, the customer may "snooze" an alert. In other words, the customer may request that an alert be provided at a later time, when it would be more convenient for the customer. The customer may set the time and method of delivery that such alert will be sent by replying with the snooze command or by configuring his or her accounts. The customer may also ask for an alert to be redelivered in a recurring manner until he or she cancels the alert. The customer may further configure the snooze command to automatically be canceled when the customer has acted in satisfaction of the alert. For example, a snoozed "Low Balance" alert may be automatically canceled when the customer deposits money into the account.

When the customer requests a snooze, the customer response engine 416 may cause the alert event engine 404 to generate the alert event signal containing the customer-defined snoozed time and method of delivery, if applicable. Other possible customer commands related to alerts may include creating a new alert, modifying existing alert preferences, acknowledging the receipt of an alert and canceling of future alerts.

Embodiments of the present invention also allow the customer to respond to the alert by requesting actions that are not directly related to the subject matter of the alert that was provided. For example, a variety of financial actions may be taken unrelated to the alert, such as requests for a change of address, to reset authentication information, to retrieve account routing number, to determine balance, to transfer money, and others.

In the alert system 400, the alert event engine 404 may also be configured to automatically retransmit an alert when a customer response is not received within a particular time window. The alert event engine 404 will then cause the generation of another alert event signal. The alert delivery engine 408, having received the second alert event signal, may select a different communication channel through which the alert will be provided according to customer preferences and policies. The time window that the alert system 400 will allow for a customer response before providing a supplemental alert may be dependent on the type of alert. For example, a higher priority alert, such as one indicating a possible fraudulent transaction, may have a shorter time window than one that simply provides the customer with his or her account balance.

In one embodiment, the transmittal of subsequent alerts may be staggered. That is, the alert window may expand or contract with each alert that is provided depending on the alert. For example, the time window for high-priority contract with each subsequent transmittal but may expand for low-priority alerts. Similarly, the number of attempts to provide the alert may be dependent on the type of alerts or its priority. An alert that provides the customer with balance, for example, may only be provided once, even if the customer does not acknowledge its receipt. However, fraud alerts may allow for a large or even infinite number of transmittals until some form of acknowledgement is received.

The alert system 400 may also automatically cancel a snooze alert if a customer has completed an action. For example, if the customer pays a bill prior to the generation of subsequent snooze alert, the alert system 400 may be configured to cancel the alert. Furthermore, a snooze command may direct the system 400 to snooze until an account balance is due or until the balance is below a specified amount. Furthermore, in one embodiment, a customer may direct the alert system 400 to snooze an alert on one communication channel but to resend the alert to an alternative channel at the later time.

In one embodiment, the customer may respond by providing feedback to the alert system, indicating whether the alert was satisfactory or unsatisfactory. The customer may, for example, select a "thumbs up" or a "thumbs down" button to indicate his or her satisfaction or dissatisfaction with the alert. The customer may provide such feedback in connection with the alert type, the alert delivery channel, the delivery type, and/or other aspects. The customer may also provide the customer response engine 416 with his or her desires as to the type of alert to stop, the delivery method that he or she prefers more, or additional alerts that he or she would like to be provided, as may be defined by the customer in his or her response. The engines of the alert system 400 may modify its alert accordingly. Based on the feedback, the alert system may change its operations accordingly. For example, based on a negative feedback, the alert system 400 may cause the alert delivery engine 408 to avoid delivering text messages to a customer when dynamically determining the optimal delivery channels and time. In at least one embodiment, the feedback provided through these features may be utilized in improving the dynamic operations of the various engines of the alert system 400.

Activity Gathering Engine

In one embodiment of the present invention, the alert system may further contain an activity gathering engine (not shown) that automatically gathers account, social and other activities of the customers. In some embodiments, the capabilities of the activity gathering engine are incorporated into one of the other engines. The alert event engine 204 may gather activities of the customer on demand, on a regular interval or in response to a new social activity at the networks configured by the user (and granted access if necessary) in order to populate and update the customer database.

The activity gathering engine may automatically gather and search all information on the Internet and other sources. In such embodiments, the activity gathering engine may search for keywords or an alias known to be associated with a customer. A thorough search of the Internet and social networks may allow the alert system 200 to comprehensively populate and update the customer database 212, thereby, improving the accuracy with which alerts are provided to the customers.

The activity gathering engine, in one embodiment, is capable of gathering data from not just the actual text of a social activity, but may also gather information from images, videos, sounds, metadata and information contained therein. For instance, by analyzing the content and the metadata of a picture, the engine may determine the location and time at which a picture was taken. In many modern cameras, the global positioning system (GPS) coordinates, the time taken and other useful information may be gathered. In another embodiment, the activity gathering engine may be able to detect faces or voices corresponding to a customer. Such information may also be provided to the activity gathering engine from a third-party system that may perform such actions for the alert system. This may be preferable in many instances in order to reduce processing costs to an alert system.

These examples and embodiments are merely illustrative of the alert system of the present invention. While particular embodiments of the invention have been illustrated and described in detail herein, it should be understood that various changes and modifications might be made to the invention without departing from the scope and intent of the invention. Indeed, it should be readily apparent to one of ordinary skill in the art that the presently disclosed alert system may be modified to operate in an operational banking computer system.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. An alert system for providing alerts to at least one customer at an optimal time in response to an alert event, the alert system comprising:
a customer database stored in a memory, the customer database storing data including stored activity data and alert preference data of the at least one customer, and indicator data from at least one third-party source;
a transaction input engine, the transaction input engine receiving activity data of the at least one customer from a plurality of transaction channels for storage in the customer database as the stored activity data of the at least one customer; the plurality of transaction channels supporting a plurality of different transaction types;
an alert delivery engine using processor components to execute processing instructions stored in the memory, the executing causes the processor components to perform at least the following operations,
determining an alert type based at least on at least a portion of the stored activity data of the at least one customer, the alert preference data of the at least one customer, and the indicator data from at least one third party source;
determining priority of an alert based at least on a portion of the stored activity data of the at least one customer;
determining the optimal time for the alert system to transmit the alert based on at least status data, the alert preference data of the at least one customer, the alert type, the priority of the alert, and a portion of the stored activity data of the at least one customer, including stored activity data of at least one prior transaction, to provide the alert to the at least one customer;
generating the alert; and
causing the alert system to output the alert at the optimal time;
wherein the status data includes at least data describing a status of the alert system or a status of at least one communication channel.

2. The alert system of claim 1, further comprising an alert event engine, the alert event engine processing at least a portion of the data in the customer database and generating an alert event signal that is associated with the at least one customer, the alert delivery engine further performing the step of receiving the alert event signal from the alert event engine.

3. The alert system of claim 2, wherein the alert event engine generates the alert event signal based on the alert preference data of the at least one customer.

4. The alert system of claim 2, wherein the alert event engine generates the alert event signal based on at least a portion of the stored activity data of the at least one customer.

5. The alert system of claim 2, wherein the alert event engine generates the alert event signal based on at least an activity detection policy.

6. The alert system of claim 1, wherein the determining of the optimal time or the priority of the alert by the alert delivery engine is at least based on location and timing activity data of the at least one customer.

7. The alert system of claim 1, wherein the determining of the optimal time or the priority of the alert by the alert delivery engine is based on promotional offers or programs available for the at least one customer according to the stored activity data of the at least one customer.

8. The alert system of claim 1, wherein the determining of the optimal time or the priority of the alert by the alert delivery engine is based at least on a delivery policy, the alert delivery engine further executing processing instructions stored in the memory to update the delivery policy based at least on historical activity data of a plurality of customers, wherein the updating is performed without an external request.

9. The alert system of claim 1, wherein the stored activity data of the at least one customer comprises at least one of the following:
transaction and account activity;
profile activity; and
social networking activity.

10. The alert system of claim 1, wherein the alert delivery engine using processor components to execute processing instructions stored in the memory determines an optimal communication channel of the at least one communication channel and delivers the alert using the optimal communication channel, wherein the optimal communication channel comprises one of the following:
voice telephone;
electronic mail;
text messaging;
application based messaging;
automated teller machines;
home systems;
vehicle systems;
personal electronics;
social media;
electronic appliances; and
the Internet.

11. The alert system of claim 10, wherein the determining of the optimal communication channel by the alert delivery engine is at least based on customer usage data of the at least one communication channel.

12. The alert system of claim 1, wherein the alert delivery engine executes processing instructions stored in the memory to update the customer database based on the alert, wherein the updating causes the alert delivery engine to determine a different alert type, priority or optimal time for subsequently-received activity data of the at least one customer, the updating performed by the alert delivery engine without an external request.

13. An alert system for providing alerts to at least one customer at an optimal time in response to an alert event, the alert system comprising:
a customer database stored in a memory, the customer database storing data including stored activity data and alert preference data of the at least one customer, and indicator data from at least one third party source;
a transaction input engine, the transaction input engine receiving activity data of the at least one customer from a plurality of transaction channels for storage in the customer database as the stored activity data of the at least one customer;
an alert delivery engine, using processor components, to perform at least the following operations:
determining an alert type based at least on the stored activity data of the at least one customer, the alert preference data of the at least one customer, and the indicator data from at least one third party source;

determining priority of an alert based at least on the stored activity data of the at least one customer;

determining the optimal time for the alert system to transmit the alert based on at least status data, the alert preference data of the at least one customer, the alert type, the priority of the alert, and the data in the customer database, including activity data describing at least one prior transaction, to output the alert at the determined optimal time; and wherein the status data includes at least data describing a status of the alert system or a status of at least one communication channel; and a customer response engine for receiving a customer response to the alert.

14. The alert system of claim 13, wherein the customer response engine receives the customer response to at least the outputted alert, the alert delivery engine further performing the steps of determining, based on the data in the customer database, a second optimal time, an optimal communication channel of the at least one communication channel, and outputting a second alert at the determined second optimal time and the optimal communication channel.

15. The alert system of claim 14, wherein the customer response contains at least one of the second optimal time and the optimal communication channel.

16. The alert system of claim 13, wherein the alert is a recurring alert.

17. The alert system of claim 13, wherein the customer response is a banking request.

18. The alert system of claim 13, wherein the customer response is feedback, the feedback related to customer satisfaction of at least one of the alert, and the determined optimal time.

19. A computer-controlled method for providing alerts to at least one customer at an optimal time, the method comprising the steps of:

receiving and storing activity data of the at least one customer from a plurality of transaction channels;

receiving an alert event signal at an alert delivery engine, the alert event signal associated with the at least one customer;

determining an alert type based at least on the stored activity data of the at least one customer, alert preference data of the at least one customer, and indicator data from at least one third party source;

determining priority of an alert based on data in a customer database including the stored activity data of the at least one customer;

determining the optimal time for the at least one customer to receive the alert based on at least status data, the alert preference data of the at least one customer, the alert type, the priority of the alert, and data in the customer database including activity data describing at least one prior transaction, to provide the alert to the at least one customer;

generating the alert; and causing output of the alert at the determined optimal time;

wherein the status data includes at least data describing a status of the alert system or a status of at least one communication channel.

20. The method of claim 19, further comprising the step of processing at least a portion of the data in the customer database at an alert event engine, the alert event engine generating the alert event signal.

21. The method of claim 20, wherein the processing step is based at least on an activity detection policy.

22. The method of claim 19, wherein the step of determining of the priority of the alert or the optimal time is at least based on location and timing activity data of the at least one customer, customer usage data of the at least one communication channel, or a priority of the alert event signal.

23. The method of claim 19, further comprising the steps of receiving a customer response to at least the outputted alert and causing the generation of a future alert event signal.

24. The method of claim 23, further comprising the steps of determining, based on the data in the customer database, a second optimal time and an optimal communication channel of the at least one communication channel, and outputting a second alert at the determined second optimal time and the optimal communication channel.

25. The method of claim 24, wherein the step of determining the second optimal time and the optimal communication channel is in accordance with the future alert event signal.

26. The method of claim 24, wherein the future alert event signal includes a preferred communication channel or a preferred time, or is a recurring alert event signal.

27. An alert system for providing alerts to at least one customer at an optimal time in response to an alert event, the alert system comprising:

a customer database stored in a memory, the customer database storing data including stored activity data and alert preference data of the at least one customer, and indicator data from at least one third party source;

a transaction input engine, the transaction input engine receiving activity data of the at least one customer from a plurality of transaction channels for storage in the customer database as the stored activity data of the at least one customer;

an alert event engine for processing at least a portion of the data in the customer database including the stored activity data and alert preference data of the at least one customer, and the indicator data from at least one third party source, and generating an alert event signal including type and priority of the alert event signal;

an alert delivery engine using processor components to execute processing instructions stored in the memory, the executing causes the processor components to perform at least the following operations:

receiving the alert event signal from the alert event engine, the alert event signal associated with the at least one customer, determining an alert type based at least on the stored activity data of the at least one customer, the alert preference data of the at least one customer, and the indicator data from at least one third party source;

determining an optimal time and a communication channel for the alert system to transmit an alert to the at least one customer based on at least the alert event signal, status data, and the data in the customer database including at least one of usage data of at least one communication channel, activity data of at least one prior transaction, and location and timing of at least one customer activity;

generating the alert; and causing the alert system to output the alert at the determined optimal time and the determined communication channel; and a customer response engine for receiving a customer response to at least the outputted alert, the customer response engine causing the alert event engine to generate a future alert event signal;

wherein, in response to receiving the future alert event signal, the alert delivery engine determining, based on the data in the customer database, a second optimal time and a second communication channel of the at least one communication channel in accordance with the future alert event signal, and generating a second alert, and causing the alert system to output the second alert at the determined second optimal time and the determined second communication channel;

wherein the status data includes at least data describing a status of the alert system or a status of the at least one communication channel.

* * * * *